Patented Aug. 24, 1943

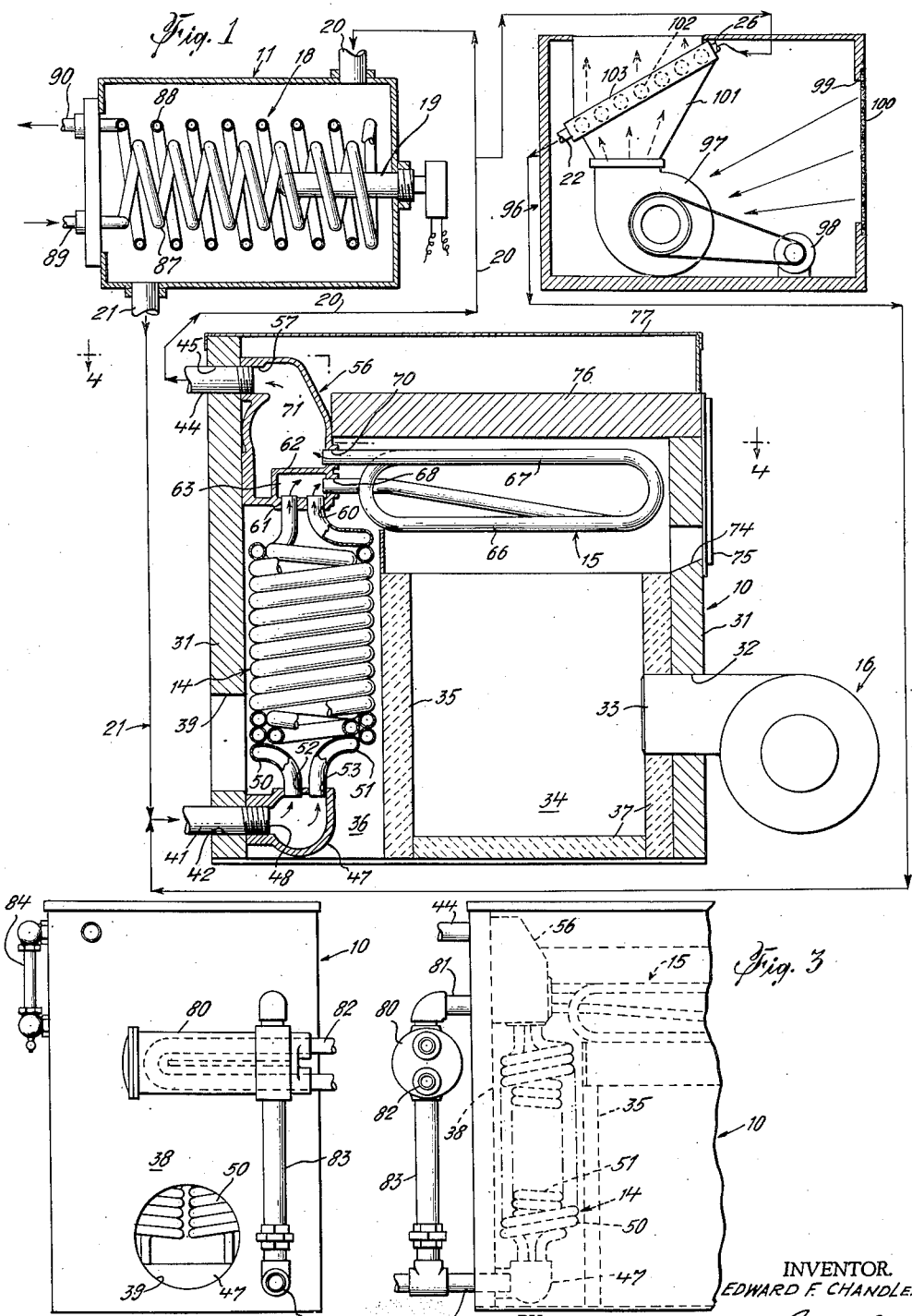
Aug. 24, 1943.  E. F. CHANDLER  2,327,339
HEATING SYSTEM
Filed Dec. 24, 1940   2 Sheets-Sheet 1
INVENTOR.
EDWARD F. CHANDLER
BY John P. Chandler
his Attorney

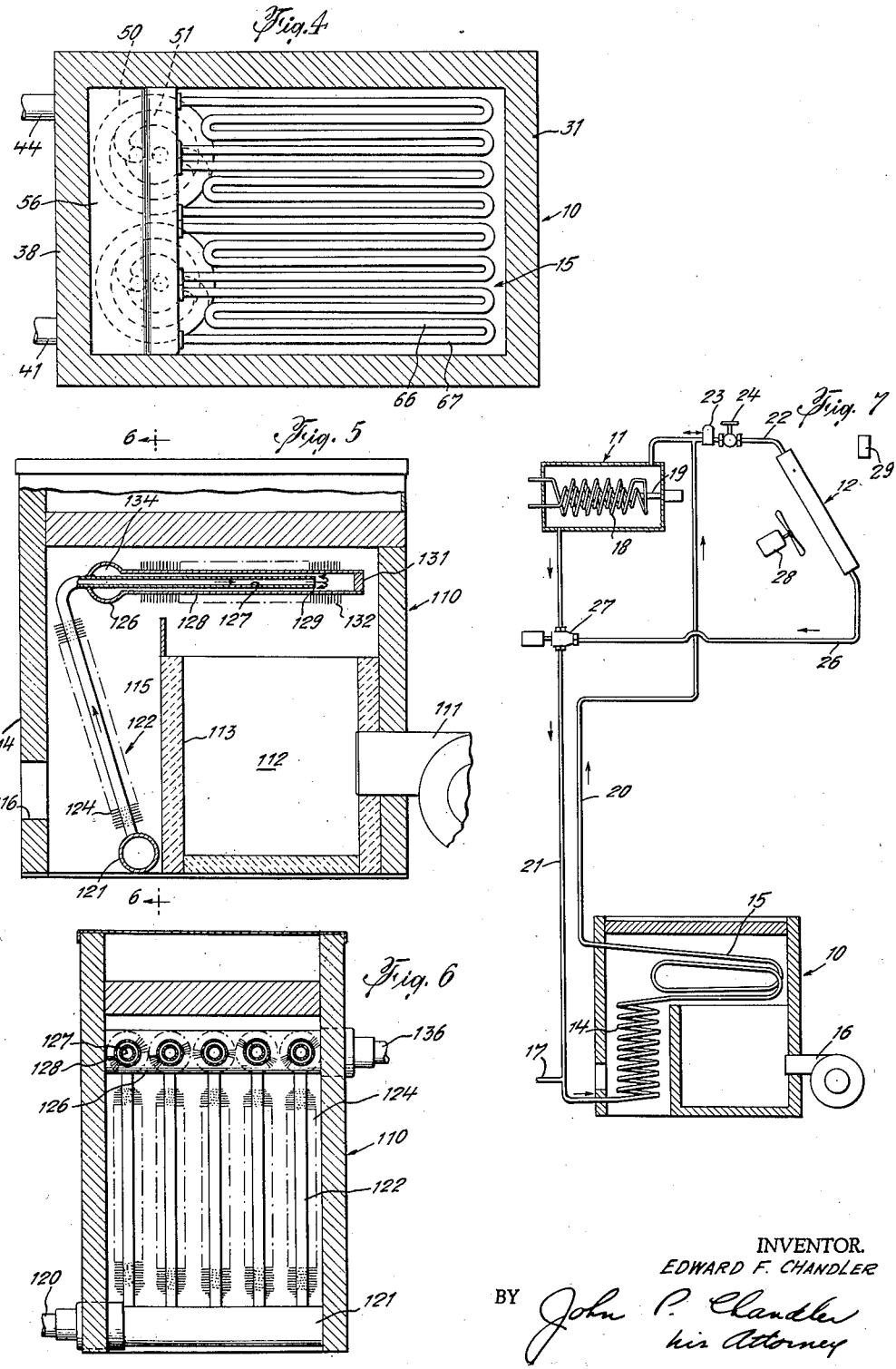

2,327,339

UNITED STATES PATENT OFFICE 2,327,339

HEATING SYSTEM

Edward F. Chandler, Brooklyn, N. Y.

Application December 24, 1940, Serial No. 371,516

11 Claims. (Cl. 237—3)

This invention relates to new and useful improvements in heating systems, and relates more particularly to a novel method of heating water for domestic use as well as space heating, and to an improved apparatus and system for carrying out the method. The principal object of the present invention is to provide an improved heating system having a high order of operating efficiency and economy, and also possessing simplicity of structure and operation. Another object of the invention is to provide a heating system of this character which can be installed at exceedingly low cost.

Still another object of the present invention is to provide a heating system which will effectively and economically operate on reduced load during summer months, while space heating radiators are inactive, for heating water to be consumed for domestic and other purposes, and which will operate with equal effectiveness during winter months for room or other space heating.

The system includes a circuit in which a body of heated fluid is circulated by thermal-syphon action, a zone in which a portion of the fluid may be intensely heated as it passes therethrough, and a relatively small storage element in which the heated fluid is accumulated. The storage element includes heat transfer means for heating water for consumption, and heat responsive means for controlling operation of the heat-generating element. The system further includes heat radiating means which may be rendered completely inoperative, or fully or partially operative at will.

The general arrangement of the system is such that the several component parts thereof, to wit, the heat-generating element, the combined heat storage and heat transfer element, and the heat-radiating structure, are of unusually small dimensions and occupy a minimum of space, particularly when considered in the light of the large output of heat from the system.

Thus, a further object of the invention is the provision of an improved heat-generating element for a fluid system, the element having a far higher efficiency than existing hot water heating furnaces. Another object of the invention is the provision of improved heated fluid storage means of almost miniature proportions, but wherein a considerable amount of water in the domestic circuit may be heated and utilized without requiring the addition of heat to the main circuit.

Yet another object of the invention is the provision of an improved method of control for a dual heating system, that is, one supplying heat for radiation as well as heated water for consumption, wherein the action of restoring heat to a partially depleted circuit is delayed until a critical reduction has resulted, at which time the heat is rapidly and expeditiously restored to the circuit. At no time, however, does the heat reduction impair the effective output of the system. In other words, a reasonable amount of hot water may be drawn from the storage tank without upsetting the heat balance and without starting the burner in operation. If a large quantity is withdrawn, however, the heat balance is rapidly restored, and at no time, within reasonable limits, will the user be required to "wait for hot water." Furthermore, the system is capable of rapid restoration of the heat balance for domestic hot water, whether the space heating element is inactive, running at reduced capacity, or is operating at peak capacity.

Yet another object of the invention is the provision of a novel combined heat storage and heat transfer device, or "tankless" heater, wherein a heat transfer coil is positioned within a heated fluid storage tank, and water passing through the coil furnishes hot water for domestic use. A heat responsive control element extends into the tank in such a position as to be critically responsive to major temperature changes as disturb the heat balance of the system, but which permits a moderate supply of the hot water for domestic use to be withdrawn without starting the burning in operation.

The present application constitutes a continuation-in-part of my application Serial No. 312,240, filed January 3, 1940. Whereas the several embodiments of the invention illustrated in the drawings refer to systems designated primarily for domestic use, it is nevertheless to be understood that the invention is not limited to such specific embodiments and uses since it may be employed for heating and supplying hot water to factories, lofts, barracks, or any other type of structure.

In the drawings:

Fig. 1 is a section taken through the three principal elements of the system comprising the present invention, the several views constituting the figure showing certain details of the construction of these three elements.

Fig. 2 is a rear elevation of the burner or heat-generating element.

Fig. 3 is a broken side elevation thereof, the view showing certain of the internal parts in broken lines.

Fig. 4 is a horizontal section taken on line 4—4 of Fig. 1.

Fig. 5 is a central vertical section taken through a modified form of heat-generating element.

Fig. 6 is a vertical section taken on line 6—6 of Fig. 5.

Fig. 7 is a diagrammatic view showing the system as a whole.

The preferred embodiment of the system as a whole, illustrated diagrammatically in Fig. 7, will first be generally described, and a detailed description of the specific structure of the individual elements in the system will follow. The system includes a heat-generating element 10 in which a relatively small quantity of fluid is intensely heated, a storage element 11 in which the intensely heated fluid is accumulated, and heat radiating element 12, such element including means for passing air over a radiator, whereby said air is heated and the fluid in the radiator is cooled.

The heat-generating element includes one or more preheating coils 14, one or more heat-generating coils 15, and a heat-generating unit 16 such as a pressure oil burner. The fluid storage element includes an internally disposed heating coil 18 for providing hot water for domestic purposes other than heating, and an aquastat 19. The heated fluid is adapted to be circulated through the system by thermal-syphon action, such fluid passing from the heat-generating coil 15 through a delivery pipe 20 into storage tank 11, and from storage tank 11 the cooler fluid passes through return pipe 21 to the lower end of pre-heating coil 14. Return pipe 21 may be connected with a suitable source of fluid supply 17, such, for instance, as the city water main, and delivers water under pressure to the unit when required. It will be appreciated that any other means for supplying water to the system may be employed. A second delivery pipe 22 connects with pipe 20 adjacent to its connection with storage tank 11, an air relief valve 23 and a conventional shut-off valve 24 being included in delivery pipe 22.

During summer operation when no heat is required in radiator 12, valve 24 is closed, and during such period operation of burner 16 is controlled solely by aquastat 19. In winter operation, however, valve 24 is opened and the highly heated fluid passes into delivery pipe 22, through radiator 12, and through return pipe 26 which is connected with return pipe 21 leading to preheater coil 14, a second aquastat 27 being preferably positioned in the line of flow at the point where pipe 26 is joined with pipe 21. A suitable wiring circuit (not shown) connects aquastats 19 and 27 in parallel with burner 16 to cause the burner to commence operation when a predetermined drop in temperature of the water in the zone of either aquastat occurs. During operation a fan 28 causes air to pass through the radiator for room heating purposes. It will thus be apparent that so long as burner 16 is operating the fluid which is intensely heated within coils 15 causes a relatively rapid rate of circulation of the fluid through the system. A conventional thermostat 29 placed in the room to be heated will control operation of fan 28, and accordingly when the temperature of the room drops to a predetermined minimum the fan is set in operation, thus withdrawing heat from radiator 12 which will in turn influence aquastat 27.

In summer operation aquastat 27 will, of course, be rendered inoperative, and only a relatively small amount of heat will be transferred from the system to the domestic hot water coils 18, and accordingly the burner will be in only occasional operation. Moreover, the withdrawing of a moderate amount of hot water from coils 18 will not immediately start the burner in operation, since the aquastat 19 will not close the circuit until a considerable drop in temperature occurs. Nevertheless, if sufficient water is drawn off to materially disturb the heat balance, the heating element is put into peak operation and the heat balance is restored in a very few minutes. In winter operation, on the other hand, cool water is flowing through pipe 26 into pipe 21 the greater part of the time, and accordingly aquastat 27 may cause burner 16 to be in relatively continuous operation.

Referring now more particularly to the heat-generating unit 10 shown in Figs. 1, 2 and 3, it will be noted that the housing is generally rectangular and is desirably made from appropriate heat-insulating material. The front wall 31 thereof is formed with an opening 32 which receives the air tube 33 of a conventional pressure oil burner 16, although it will be understood that any other type of heating element may be used to supply heat to the combustion chamber which is designated as 34. For instance, heat may be furnished by gas, by the combustion of solid fuel on a grate, in conjunction with an automatic stoker, or by any other suitable heating means which will lend itself to automatic operation as required by the present system.

In the embodiment shown, the rear of the combustion chamber is defined by an intermediate vertical wall 35, thus forming a pre-heating chamber 36 between the rear surface of such wall 35 and rear wall 38 of the housing. Wall 35 is desirably formed of fire brick, or other heat-refractory material, and the other walls of the combustion chamber 34 are also lined with sheets of similar material shown at 37. An opening 39 in rear wall 38 forms a stack outlet for the combustion gases which pass from the combustion chamber over the upper end of wall 35 and into pre-heating chamber 36. Return pipe 21, illustrated diagrammatically in Fig. 1, is connected with inlet pipe 41, which passes through an aperture 42 adjacent to the lower edge of rear wall 38, and water outlet pipe 44, connected with delivery pipe 20, passes through an aperture 45 adjacent to the upper edge of such wall.

In the preferred embodiment, an inlet header or manifold 47, preferably formed of cast iron, is provided with a threaded aperture 48 which receives inlet pipe 41. In order to secure the maximum pre-heating effect within the relatively small pre-heating chamber 36, pre-heating coils designated generally by the reference numeral 14 desirably include a plurality of sets of concentrically disposed helical pipes 50 and 51. At its lower end, coil 50, being the exterior coil, enters the inlet header 47 through an aperture 52, and interior coil 51 enters through aperture 53. Outlet header or manifold structure 55 is formed with a threaded aperture 57 to receive outlet pipe 44. Outer pre-heating coil 50 enters the lower surface of header 55 through aperture 60, and the upper terminal of inner pre-heating coil 51 enters through aperture 61. An interior wall 62 forms an elongated chamber 63 into which the pre-heated water from coils 50 and 51 passes.

At the upper end of combustion chamber 34, and directly in the radiant heat zone, the heat generator tubes 15 are positioned. These tubes are preferably trombone shaped and comprise a plurality of lower and upper interconnected sections 66 and 67, respectively. Lower sections 66 are desirably spaced to one side of upper sections 67, all as is shown in Fig. 4, in order to have each component part of the several generator tubes in such a spaced relation as to receive the maximum heat generated within the combustion chamber. The terminal of lower tube section 66 enters chamber 63 through an opening 68 in the front wall of outlet header 56, and the terminal of upper section 67 enters the main chamber 71 of outlet header 56 through an aperture 70. A sight opening 74 is formed in front wall 31 of the housing, and a sheet of transparent material 75, which may be removable, is placed over the opening. The housing is closed at its upper end by means of a cover 77 which may be removable.

Storage tank 11 supplies the heat transfer for the domestic hot water supply, and if desired an auxiliary domestic hot water supply system, unconnected with tank 11, may be provided as shown in Figs. 2 and 3. A small cylindrical housing 80 is connected with outlet header 56 by means of pipe 81, and within such housing a U shaped domestic hot water supply pipe 82 is positioned. The water passes out of housing 80 through pipe 83 and into inlet header 47 through inlet pipe 41. This arrangement is particularly useful in case the system is a steam unit, and a water gauge 84 may also be included in this system. In this case steam issues through pipe 44 to the radiators, and upon condensing gives up heat and returns as water to re-enter the unit through pipe 41 and then passes up through coils 14 to header 56 in which a water level is maintained, as indicated by gauge glass 84. At the same time circulation of the water takes place from header 56 through pipes 81, 80 and 83 and back to the unit through pipe 41. The rapid generation of steam is aided by this circulation of the heated water while at the same time this "impulse induced" circulation insures efficient performance of the auxiliary domestic hot water unit or heat exchanger 80. It will be appreciated that if the heat-generating unit 10 of the present invention is employed for a steam, as distinguished from a hot water, heating system, tank 11 may, if desired, be eliminated, and domestic hot water unit 80 used solely in its place.

For ordinary domestic purposes storage tank 11 may be of a capacity of ten gallons, or thereabouts, and is preferably cylindrical in shape. The heat sensitive element of aquastat 19 extends axially through the center of the storage tank and is enclosed by, but spaced from, a longitudinally disposed heat-exchange coil 18 for domestic hot water, which, in the preferred embodiment, includes a helical coil comprising an inner portion 87 and an interconnected outer portion 88 spaced therefrom. Outer helical portion may have a diameter roughly one-half the diameter of the tank, and inner portion from one-quarter to one-third such diameter. If desired, a single coil may be employed. In the structure illustrated portion 87 is connected with inlet pipe 89, and outer portion 88 is connected with outlet pipe 90. Delivery pipe 20 and return pipe 21 may be positioned at opposite ends of the tank, and the tank may be covered with suitable insulating material (not shown). By placing the heat sensitive element of the aquastat in the position shown a reduction of temperature of the fluid in coil 18, due to drawing off of the hot water, does not immediately cause a sufficient drop in temperature of the fluid in the main system to actuate aquastat 19, but rather is this response delayed.

Water in the circuit may pass directly into a conventional radiator, although it is preferred to use a heat-radiating structure of the type illustrated somewhat diagrammatically in Fig. 1. This structure includes a generally rectangular housing 96 having mounted therein a blower 97 operated by an electric motor or other source of power 98. An opening 99 in one side wall thereof receives a filter 100, and air entering the housing through the filter passes into the blower, from whence it is projected upwardly through a funnel-shaped conduit 101, and through a plurality of spaced pipes 102 joined at their terminals by means of headers 103. The heated air may be distributed throughout the structure by any means known in the art. Room thermostat 29, previously mentioned in connection with Fig. 7, controls the fan or blower.

The modified heat-generating device illustrated in Figs. 5 and 6 includes a generally rectangular housing 110, a burner 111 communicating with the combustion chamber 112, and the partition 113 spaced from rear wall 114 and defining a preheating chamber 115. The combustion gases pass outwardly through stack outlet 116. In this instance, cold water enters through return pipe 120 and into inlet header 121, which may be formed from a short length of pipe and having a number of spaced apertures in the upper wall thereof. A plurality of pre-heating tubes 122 are received at their lower ends in such apertures.

The pre-heater tubes 122 in this instance are shown as having a plurality of integrally formed, radially disposed heat-radiating fingers or splines, although any other type of tube having an extended heat-absorbing surface may be employed. At their upper ends tubes 122 pass into an outlet header 126. The heat-generating element comprises a plurality of spaced, concentrically disposed tubes 127 and 128, the former being connected with the upper ends of preheating tubes 122 and being open at their outer ends, as shown at 129. Outer tube 128 is closed at its outer end, as shown at 131, and the preheated fluid passes outwardly through this inner tube into the outer tube, which latter is likewise provided with the integrally formed heat-radiating fingers 132. Thus, the partially heated water passing outwardly through tube 127 is intensely heated as it passes backwardly in a thin film in the area between tubes 127 and 128. This highly heated fluid passes outwardly through outlet pipe 136.

The storage tank 11 embodied in the present system is not, of course, limited to one of the capacity indicated, since the precise size of this tank will vary depending upon the normal load and other demands of the system. It will be apparent, however, that this storage tank is very considerably smaller than storage tanks generally used in systems of this character. Moreover, the relationship between the capacity of the tank to the total volume of water in the system is very low.

In addition to this novel feature of the system as a whole, it will be noted that the volume of fluid enclosed by the coil is less than the volume surrounding the coil, the aquastat 19 extending into this central water core. Because of the relatively small volume of water and its obvious quicker response to temperature changes caused by the incoming cold water entering the coil, a supersensitive control zone is afforded for the aquastat. The total volume of water in the tank is sufficient to permit storing enough heat to insure a reasonable supply of domestic hot water at all times. However, when a considerable quantity of hot water is drawn, the temperature of the water enclosed by the coil will be reduced sharply and thus cause the aquastat to function, thereby causing heated water to be supplied to the tank to compensate for the heat carried off by the domestic hot water. Accordingly, a relatively continuous supply of domestic hot water may be drawn without seriously disturbing the heat balance within the system. In other words, there is no loss of time for "recovery," or waiting for the tank to again heat up.

In a system employing the foregoing improved thermal storage tank with heat-exchange coil therein for domestic hot water supply, it is quite important, in order to secure the maximum effectiveness, to provide a boiler or other source of hot water which is capable of rapidly supplying the heated fluid storage tank when such hot water is called for by the aquastat. It is preferred to employ a hot water generator of the type shown in Figs. 1 or 5; it will nevertheless be understood that the herein described thermal storage element may be used in connection with a boiler in which a relatively large reserve body of water is maintained at a suitably high temperature and circulated to and from the tank by thermal syphon action. In this instance, however, it is well to install a circulating pump in the return limb of the circuit, such pump to be under the control of the aquastat, so as to afford a rapid and adequate supply of heated water to the thermal storage tank to make up the heat loss due to withdrawal of domestic hot water from the coil.

The operation of the system will be largely clear from the foregoing description. The combined volume of fluid in the preheating zone, defined by coils 14, and in the intense heating zone, defined by coils 15, is considerably less than the volume of fluid in the thermal storage zone 11, small as is this latter volume. The high efficiency of transfer of heat from the burner to both coils is evidenced by virtue of the fact that a substantially perfect contraflow action is obtained. In other words, the heat differential between the heat generated in chamber 34 (Fig. 1) and coils 15 containing the pre-heated water is very great, and these coils absorb the major portion of such heat. The escaping hot gases traveling downwardly over the surface of coils 14 are further utilized in the most effective manner possible, and little heat remains when the gases pass out of stack outlet 39. Thus, the water is rapidly circulated through the heating element and the heat balance of the system is rapidly restored under any conditions whatsoever.

The water in tank 11 will always be maintained at a predetermined temperature, and when domestic water is removed from coil 18 or when heat is withdrawn from the system through radiator 12, and the temperature of the fluid is reduced a predetermined amount, aquastats 19 and 21, respectively, will cause burner 16 to start operating, or to increase its supply of heat in order to bring the fluid in the system back to the predetermined temperature setting. Accordingly, it will be apparent that reasonable quantities of heated fluid may be withdrawn from coil 18 from time to time without immediately seriously disturbing the heat balance.

What I claim is:

1. In a heating system, the combination of a plurality of elements comprising, respectively, a heat generating zone, a heat storage zone, a heat radiating zone, means for circulating a fluid heat absorber through said zones, means for adding heat to said fluid as it passes through the generating zone, means responsive to changes in the temperature of said fluid controlling said means for adding heat, means for utilizing the heat of the fluid in said radiating and said storage zones whereby the temperature of said fluid is changed, means comprising a blower for removing heat from the radiating zone, controlling means for the blower comprising a thermostat positioned within the area to be heated, and means for eliminating the influence of changes in temperature of the fluid in said radiating zone upon said means for adding heat.

2. In a heating system, the combination of a heating element, a heat storage element, a heat-radiating element, and a fluid heat-absorber delivery pipe and return pipe, means connecting the heating element with the other two elements, the heating element comprising means for preheating and means for intensely heating a sufficiently small quantity of the fluid to cause relatively rapid circulation of such fluid through the system during operation of the heating element, the heat storage element being of sufficiently small dimensions to cause a major portion of the entire body of fluid in the system to be in circulation during operation of the heating element, said storage element including a heat transfer element therein for heating water for domestic use, and temperature responsive control means positioned in the heat storage element and in the return pipe from the heat-radiating element to independently render the heating element active.

3. In a heating system, the combination of a heating element, a heat storage element, a heat-radiating element, means for delivering heated fluid from the heating element to the heat storage and the heat-radiating elements, and means for returning fluid from such elements to the heating element, the heating element comprising means for pre-heating and means for intensely heating a small quantity of the fluid, the heat storage element being of relatively small dimensions and including a heat transfer coil therein for heating water for domestic use, a plurality of temperature-responsive control means to independently render the heating element active, one of such means being so positioned relative to the heat storage element as to be influenced by the temperature of the fluid contained therein, and another of said means being so positioned relative to the fluid returning means from the heat storage and the heat radiating elements as to be influenced by the temperature of the fluid contained in either of said elements so long as both elements are receiving heat, and manual means for rendering the heat-radiating element and the latter temperature-responsive control means inactive.

4. In a dual heating system, the combination of a plurality of elements comprising, respectively, a heat storage zone, and a heat radiating zone, means comprising a heat generator for supplying heated fluid to both zones, a pipe from the heat generator for delivering heated fluid to the heat storage zone and to the heat radiating zone, and a pipe for returning cooled fluid to the heat generator from both zones, a heat exchanger in the storage zone for supplying domestic hot water, thermal means in the storage zone responsive to temperature changes due to withdrawal of hot water and causing the generator to supply heated fluid to the storage zone, and means thermally responsive to the temperature reduction of the fluid in the radiating zone for causing the generator to replace heat removed from such zone.

5. In a dual heating system, the combination of a plurality of elements comprising, respectively, a heat storage zone, and a heat radiating zone, a pipe for delivering heated fluid to the heat storage zone and to the heat radiating zone, and pipes for returning cooled fluid from both zones, means comprising a heat generator for supplying heated fluid to both zones, a heat exchanger in the storage zone for supplying domestic hot water, and a blower for passing air to be heated through the heat radiating zone, thermal means in the storage zone responsive to temperature changes due to withdrawal of hot water and causing the generator to supply heated fluid to the storage zone, thermally responsive means in the space to be heated for causing operation of the blower, thus withdrawing heat from the radiating zone to be absorbed by the air in such space, and thermally responsive control means at the junction of the pipes for returning the cooled fluid from both spaces, causing the generator to replace heat removed from either zone.

6. In a heating system, the combination of a heating element, a heat storage element, a heat-radiating element, and a fluid heat-absorber delivery pipe and return pipe, means connecting the heating element with the other elements, the heating element including a housing, a pre-heating area having a stack outlet, and a preheating coil positioned within such area, a heat-generating area communicating with the pre-heating area, a source of heat and a heat generator tube within such area, whereby the heat source will intensely heat the fluid in the tube and the heated gases will pass around and over the pre-heating coil and out the stack outlet, a heat transfer coil positioned in the storage element for heating water for domestic use, and temperature responsive control means positioned in the heat storage element and in the return pipe from the heat-radiating element to independently render the heating element active.

7. In a dual heating system, the combination of a plurality of elements comprising respectively, a heat storage zone, and a heat radiating zone, pipe means for delivering heated fluid to the heat storage zone and to the heat radiating zone, and pipe means for returning cooled fluid from both zones, heat generating means for supplying heated fluid to both zones comprising a plurality of chambers having an intercommunicating opening therebetween, a plurality of preheating coils connected with the return pipe and positioned in one chamber, a plurality of superheating coils and a source of heat positioned in another chamber, the volume of fluid contained in the latter coils being sufficiently small as to convert the latent energy of the heat into kinetic impulses and cause rapid circulation of fluid through the system, a heat exchanger in the storage zone for supplying domestic hot water, thermal means in the storage zone responsive to temperature changes due to withdrawal of hot water and causing the generator to supply heated fluid to the storage zone, and means thermally responsive to the temperature reduction of the fluid in the radiating zone for causing the generator to replace heat removed from such zone.

8. In a heating system, the combination of a heating element, a heat storage element, a heat-radiating element, and a fluid heat-absorber delivery pipe and return pipe means, the heating element including a housing, a plurality of interconnected chambers therein, a pre-heating coil positioned in one chamber, a source of heat and a heat generator means within the other chamber, said generator means comprising a plurality of elements forming an inner pre-heating zone and an outer superheating zone, thereby providing means whereby the highly heated water is forcibly ejected from the generator, a heat transfer coil positioned within the heat storage element for heating water for domestic use, and temperature responsive control means associated with the heat storage element and with the return pipe to selectively render the heating element active.

9. In a heating system, the combination of a heating element, a heat storage element, a heat-radiating element, and a fluid heat-absorber delivery pipe and return pipe means connecting the heating element with the other elements, the heating element comprising means for pre-heating and means for intensely heating a small quantity of the fluid, the heat storage element comprising a substantially cylindrical tank, a helical heat-transfer coil for heating domestic hot water positioned within the tank, the body of fluid enclosed by the coil being less than the body lying outside the coil and forming a temperature sensitive zone, an elongated heat-responsive control element extending into said zone, a temperature responsive control element associated with the return pipe from the heat-radiating element, and a circuit connecting each control element with the heating element to selectively render the latter active.

10. A tankless hot water generator including a heat transfer element comprising interconnected inner and outer helical coils, a housing enclosing the coil and having inlet and outlet openings for the passage of heated fluid into and out of the housing, the volume of the body of fluid enclosed by said heat transfer element being less than the volume of fluid surrounding the element, and a heat-responsive control element lying within, but spaced from, the heat transfer element.

11. In a device of the class described, the combination of a storage apparatus for heated fluid and a heat transfer element for domestic hot water supply, comprising a tank having spaced inlet and outlet openings therein, a fluid heat-control mechanism including an elongated heat-responsive element extending from one end wall of the tank axially through a portion of the center thereof, a heat transfer coil positioned longitudinally in the tank and comprising interconnected inner and outer helical portions, the inner portion lying adjacent to but spaced from the heat-responsive element, being connected with the inlet of the domestic hot water supply line, the volume of fluid enclosed by both inner and outer helical portions being less than the volume surrounding the coil.

EDWARD F. CHANDLER.